(12) United States Patent
Colizzi et al.

(10) Patent No.: US 6,366,875 B1
(45) Date of Patent: Apr. 2, 2002

(54) EVENT SIMULATOR FOR TELECOMMUNICATION NETWORKS AND METHOD FOR SIMULATING THE OPERATION OF SUCH A NETWORK

(75) Inventors: Ernesto Colizzi, Monza; Lucia Bianchi, Milan, both of (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/293,997

(22) Filed: Apr. 19, 1999

(30) Foreign Application Priority Data

Apr. 30, 1998 (IT) .......................................... TO98A0372

(51) Int. Cl.$^7$ ............................................... G06F 9/455
(52) U.S. Cl. ............................................. 703/16; 703/17
(58) Field of Search ............................. 703/15, 17, 20, 703/26, 16; 370/222, 223

(56) References Cited

U.S. PATENT DOCUMENTS

| | | | | |
|---|---|---|---|---|
| 5,774,695 A | * | 6/1998 | Autrey et al. | 703/26 |
| 5,786,770 A | * | 7/1998 | Thompson | 340/825.06 |
| 5,889,954 A | * | 3/1999 | Gessel et al. | 709/223 |
| 5,946,474 A | * | 8/1999 | Skogby | 703/13 |
| 6,128,321 A | * | 10/2000 | Bennett et al. | 370/535 |
| 6,173,244 B1 | * | 1/2001 | Pyritz | 703/20 |

OTHER PUBLICATIONS

Veitch et al., "An Integrated Restoration System for SDH-Based ATM Transport Networks", GLOBECOM Global Telecommunications Conference, vol. 3, pp. 1882–1886, Nov. 1996.*

Antonaova et al., "A Universal Simulation Model For SONT/SDH Sychronization Networks", Proc. First Annual Conference on Emerging Technologies and Applications in Comm., pp. 10–13, May 1996.*

Kesidis et al., "Feasibility of Fluid Event–Driven Simulation for ATM Networks", GLOBECOM Global Telecommunications Conference, vol. 3, pp. 2013–2017, Nov. 1996.*

Ip et al., "Modelling the Management Channel Traffic of a Synchronous Digital Hierarchy (SDH) Network", IEEE Network Operations and Management Symposium, vol. 2, pp. 619–628, Feb. 1998.*

Edwards, J. A., "Protection Interworking for SDH Networks", 6th IEE Conference on Telecommunications, pp. 202–205, Apr. 1998.*

ANSI TIXI, May 1995 (attached–Revised Edition ANSI TI.105.01–1998).

ITU–T Recommendation G.841 (Draft)—General Aspects of Digital Transmission Systems—Types and Characteristics of SDH Network Protection Architectures.

DTS/TM–03041—Oct. 1997—Version 2.5—Transmission and Multiplexing ™–SDH Network Protection Interworking.

* cited by examiner

Primary Examiner—Russell W. Frejd
(74) Attorney, Agent, or Firm—Sughrue Mion, PLLC

(57) ABSTRACT

An event simulator for telecommunication networks and a method for simulating the operation of such a network, in particular an MS-SPRING-type optical fiber telecommunication networks. The event simulator according to the present invention comprises a set of network elements, whose operation has to be tested, and event simulation means. According to the invention, said event simulation means comprise electronic processing means suitable to generate simulation signals for a virtual telecommunication network ring and interfacing means able to transmit/receive said simulation signals with the set of network elements whose operation has to be tested.

9 Claims, 3 Drawing Sheets

EVENT SIMULATOR FOR TELECOMMUNICATION NETWORKS AND METHOD FOR SIMULATING THE OPERATION OF SUCH A NETWORK

DESCRIPTION

1. Technical Field

The present invention concerns an event simulator for telecommunication networks, in particular MS-SPRING (Multiplexed-Shared Section Protection Ring) optical fiber telecommunication networks, comprising a set of network elements, whose operation has to be tested, and events simulation means. The present invention further relates to a method for simulating the operation of such a telecommunication network.

2. Background Art

In present telecommunication networks it has become extremely significant to be able to obviate to failures occurring in said networks without jeopardizing their functionality.

Therefore, telecommunication networks, particularly optical fiber networks, are provided with protection means against possible occurring of network element failures.

For instance, a Multiplexed Shared Section Protection Ring, or MS-SPRING, network is a set of network elements arranged in a topology of optical fiber network wherein a distributed protection mechanism is implemented providing for automatic restart should any faults arise in the connection fibers. By MS-SPRING network a kind of network is meant wherein network elements are connected using data sequences according to SDH structures (Synchronous Digital Hierarchy).

MS-SPRING networks perform automatic traffic restart through a synchronized rerouting of said traffic, which is actuated at each ring node. This operation is controlled by a protocol consisting of 16-bit configured bit patterns, which are continuously transmitted/received between adjacent nodes of the network.

Said protocol is based on two bytes contained in the overhead of SDH frame, called K1 and K2. Bytes K1 and K2 contain information, which can be read and written by each ring node for traffic rerouting.

Said protocol and operations involved by it with reference to the different bit patterns are defined by many international Standards issued by ANSI, ITU-T and ETSI.

Reference should be made e.g. to "*CCITT Recommendation G 841, draft, April 1995*".

Two MS-SPRING network types are defined by Standards, one for two-fiber rings, i.e. those in which each ring node is connected with another node by a span consisting of two optical fibers, carrying signals propagating in opposite direction, the other for four-fiber rings which is able to carry a higher traffic.

FIG. 1 shows an MS-SPRING two-fiber network ring 1. Said ring 1 consists of a set of 6 network elements or nodes NE. In general, network elements NE may be in a number of 2 to 16. Each network element NE has two bi-directional communication ports PO, with each port operating both for transmission and reception. One communication port PO is dedicated for clockwise traffic E, the other for counterclockwise traffic W.

Two adjacent network elements NE are connected one to each other by a span SP, which span consists of two connections CN, with each of them being obtained by an optical fiber and forwarding traffic in opposite directions, i.e. one in clockwise direction E, the other in counterclockwise direction W.

In MS-SPRING network ring 1 the bandwidth is divided in two halves of equal capacity, called work capacity and protection capacity. Work capacity is used for high priority traffic, whereas protection capacity is used for low priority traffic, the latter being lost in case of failure.

Protection in MS-SPRING network ring 1 is implemented according to a so-called "Bridge and Switch" technique, which will substantially reroute traffic from its work capacity to protection capacity in opposite direction through a proper modification of network element internal connections. Switching commands for performing the Bridge and Switch are contained in the pair of bytes K1, K2 as mentioned above.

A similar protection technique, that is classified as APS (Automatic Protection Switch), requires for each network element to be equipped inside with a device called APS controller, which is able to detect line failures, communicate relevant information to the other network elements and actuate Bridge and Switch type switching.

In implementation of MS-SPRING ring networks the problem often arises having to determine in special situations the expected behavior of the network itself caused by the presence of special complex fault combinations on interconnection fibers and/or controls (manual switch, lockout, forced switch) set by network operators.

Specifically, said problem may arise in two instances:
a) when a purely theoretic analysis of an ambiguous or anyway complex scenario is preliminary desired, in order to evaluate the expected network response;
b) when there is the need of simulating in a laboratory a situation which showed malfunctions in the operating environment due to a wrong implementation of MS-SPRING functionality in the network apparatus.

A suitable solution for item (a) would be using a pure MS-SPRING network simulator, i.e. a computer with a suitable software representing a MS-SPRING virtual network model and simulating the events of interest. As regards item (b), on the contrary, the simulator should also be able to reproduce the malfunction of the network apparatus itself as a consequence of design defects.

In order to solve item (a) no dedicated solutions have been adopted so far, except adapting general software simulators for computer networks to MS-SPRING ring networks. However, this approach appears somewhat inconvenient, since such tools are designed to perform statistical analysis (i.e. many repeated tests) of packed switching protocols supporting networks, typical for computer networks. On the contrary, simulation of an MS-SPRING network will require simulation of the behavior of one situation each time and, above all, simulation of the MS-SPRING protocol, which is not provided in available simulation software libraries, since MS-SPRING protocol cannot be classified as a "packet switching protocol". Moreover, adding a new protocol to the existing ones is generally difficult and often requires some compromises due to a limited changeability of the simulation program.

To solve item (b) the only known solution is to physically reproduce the network and the event configuration which caused the problem. Such an approach is considerably expensive from a logistic and financial viewpoint, since it requires a dedicated room provided with a considerable number of apparatus (16 in the worst case) and many instruments capable of simulating degraded signal situations (optical attenuators are used to this purpose). Additionally, it is not possible to acquire and analyse information from the network elements, since it occurs in a few milliseconds without any trace left but the final state reached by said network elements. On the other hand, said final state can only be observed through the association of proper frame processors with the optical interfaces of network elements.

It is the object of the present invention to solve the above drawbacks and provide an event simulator for MS-SPRING telecommunication networks, having a more effective and improved performance.

In this scenario, it is the main object of the present invention to provide an event simulator for telecommunication networks, which does not require physical reproduction of the telecommunication network to be simulated.

A further object of the present invention is to provide an event simulator for telecommunication networks using processing means suitable for MS-SPRING telecommunication networks.

In order to achieve such objects, the present invention provides an event simulator for telecommunication networks and/or a method for simulating events for an optical fiber network incorporating the features of the annexed claims, which form an integral part of the description herein.

Further objects, features and advantages of the present invention will become apparent from the following detailed description and annexed drawings, which are provided by way of non limiting example.

BEST MODE FOR CARRYING OUT THE INVENTION

Figure 2:
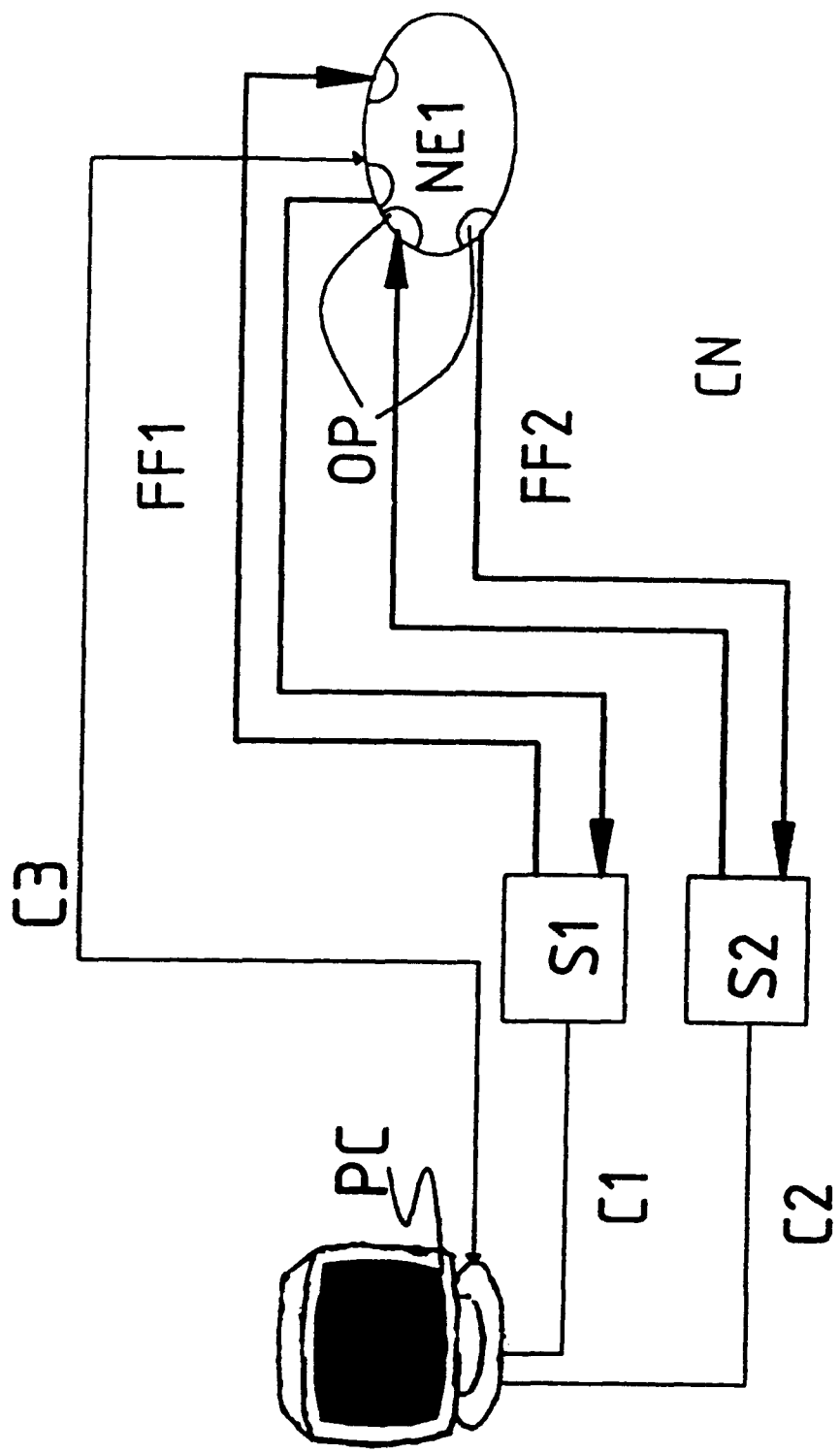
FIG. 2 shows a general schematics of the event simulator for telecommunication networks.

FIG. 2 shows schematically a simulation apparatus according to the present invention. An electronic computer PC connected by two cables C1 and C2 with two frame processors S1 and S2 of the "SDH generator/analyzer" type, i.e. able to generate frames according to SDH protocol and transmit them, as well as to analyse SDH frames being received. Cables C1 and C2 are connected at their ends to RS-232 serial interfaces, present on both the electronic computer PC and frame processors S1 and S2. At any rate, other interfaces may be used, such as IEEE488: the choice is dictated by contingent reasons of proper interface availability for both the electronic computer PC and frame processors S1 and S2.

Figure 1:
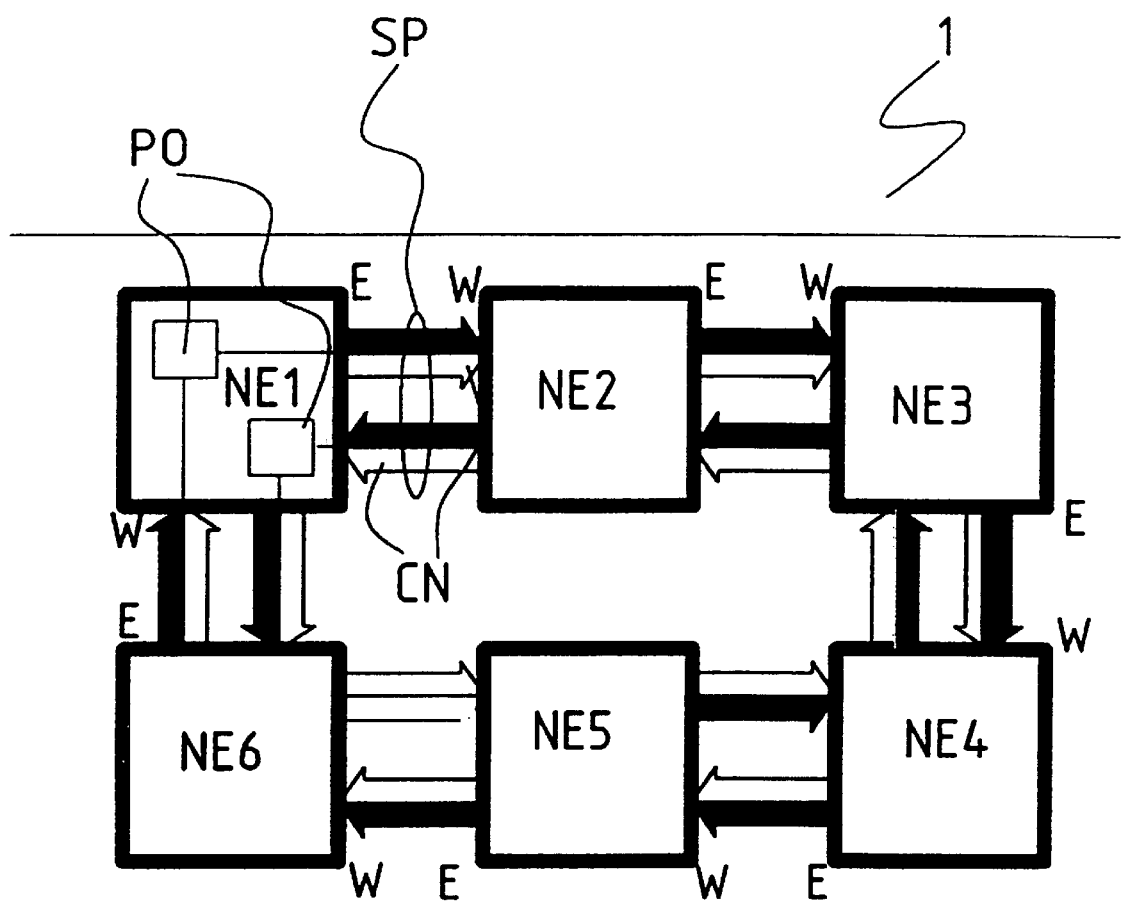
FIG. 1 shows a general schematics of an MS-SPRING telecommunication network according to the current standards.

Frame processors S1 and S2 are connected by two pair of optical fibers FF1, FF2 with a network node NE1, which is a real network node of the MS-SPRING network ring 1 shown in FIG. 1, or an apparatus operating according to SDH protocol.

A further command cable C3 connects the electronic computer PC directly with the network node NE1. Also said command cable C3 operates according to the most suitable communication protocol, e.g. IEEE488.

The schematics here described applies to MS-SPRING two-fiber networks, whereas application for four-fiber rings can be obtained by duplicating SDH frame processors S1, S2, cables C1, C2 and corresponding optical fibers FF1 and FF2.

Frame processors S1 and S2 are able to generate and analyse SDH frames belonging to desired hierarchic level (STM-4, STM-16, STM-64), corresponding to the one used in connections CN of the network ring 1 to be tested. Frame processors S1 and S2 are essentially used for transmitting and receiving K1–K2 bytes, simulating "signal fail" conditions, i.e. a not received signal and a "signal degrade', i.e. signal degradation in the connections with the external network ring 1, and testing the possible insertion of an AIS-type signal, i.e. a signal represented by a "one" sequence, defined as "squelching" in MS-SPRING specifications, which is suitable to silence traffic to avoid misconnections caused by the external network ring 1.

The electronic computer PC contains a software program organized according to the conventional architecture of the so-called "event-driven" simulators, as described in the following. It allows for representation of network virtual rings, wherein each SDH apparatus, e.g. the network element, is characterized by its inputs, outputs, state and characteristic function. Connections between the network nodes are such that the outputs of some network nodes represent the inputs for other network nodes; once the initial state of the virtual network ring to be tested has been set, any perturbation on any input of any network node will cause execution of its corresponding characteristic function and thus an output. Such an output is also characterized by the indication of the time instant it will become actually available; such an output, associated with its time instant, is stored in a list of "events to be evaluated"; now, if more logical entities evolve simultaneously, all their outputs are introduced in the list of events to be evaluated according to the order obtained by comparing their corresponding time instants. Once evolutions due to the initial change are over, the software program will start evaluating the first element out of the event list: if the entered event equals a logical entity input, then the corresponding function will be carried out, thus causing generation of other events being recorded in their turn in the list. If the number of recorded events in the list becomes exhausted, simulation will be considered concluded and a stable state reached. Should that not be the case, the program begins an auto-oscillation: once a given number of permitted evolutions is ended, the program will stop anyway to analyse the collected data. Each evolution of the simulated logical entities is recorded in a file for its subsequent diagnostic analysis.

Figure 3:
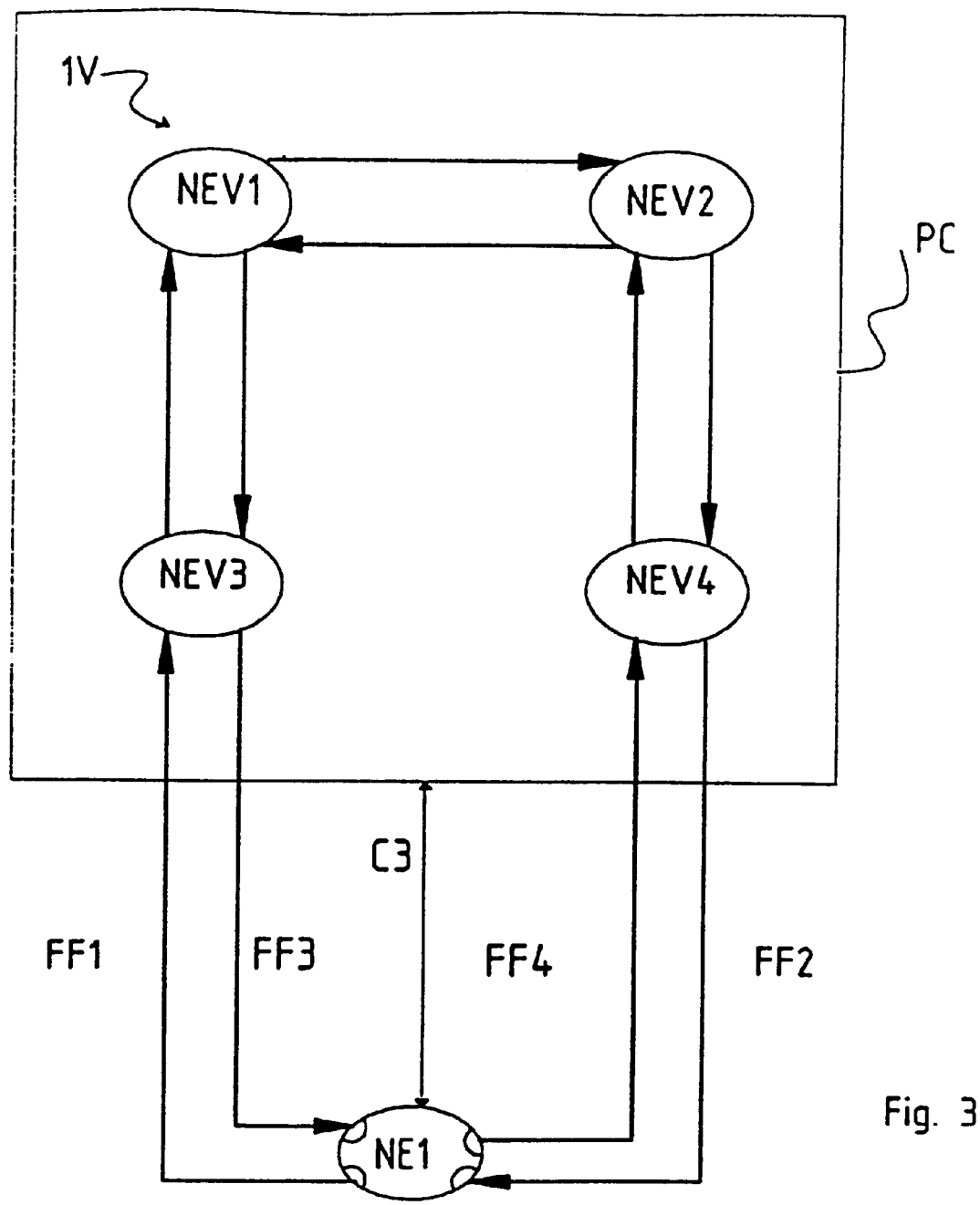
FIG. 3 shows an equivalent event simulator for telecommunication networks according to the present invention.

FIG. 3 shows an equivalent representation of the simulation apparatus according to the present invention, representing a virtual network ring 1V, which is the network ring simulated by the electronic computer PC while controlling frame processors S1 and S2. As it can be seen, according to the schematics the network virtual ring 1V is connected by optical fibers FF1, FF2, FF3 and FF4 with the network node 1, which is a physical node. In the specific case of the virtual MS-SPRING network ring 1V provided by the electronic computer PC, represented in FIG. 3, the logical entities are network elements NEV, at whose inputs the following signals may be present:

signals S, represented by pairs of bytes K1–K2 from both directions;

failure signals G, representing failures of the entering fibers (signal fail, signal degrade);

command signals M, i.e. commands set by the operator (manual switch, forced switch, lockout);

ring configuration signals C (identifying the node, in this instance network node NE1):

whereas at outputs the following signals may be present:

K signals, represented by pairs of bytes K1–K2 transmitted to both directions.

The general state of the network element is provided by:

protection state signals SP (idle, switching or pass-through);

switch signals SS (idle, bridge, bridge and switch);

switch direction signal SD (east or west);

The characteristic function is described in the MS-SPRING relating standards.

The external network element NE1 is controlled by the electronic processor PC through command cable C3, which lets the simulation apparatus to set command signals M (manual switch, forced switch, lockout) directly on the external node NE1 itself, too.

The features of the present invention are evident from the above description and also its advantages are apparent.

The event simulator for telecommunication networks according to the present invention allows connection of an external network ring with a virtual network simulated by a computer. This is particularly beneficial since it allows testing the real behavior of a physical network element in a predetermined situation provided by the computer. This operation is rather simple, as it is enough to conventionally connect the network element with SDH frame analysers/generators interfaced with the electronic computer. Favorably, the electronic computer allows sending any signal configurations associated with APS technique to the external node. Specifically, control commands may also be sent from the manual operator through a proper connection.

Favorably, the processor will allow using all its potential capabilities of information representation for providing an immediately understandable message of the network state to the operator as well as entering measurement results.

It is obvious that many variations and modifications of the present invention should be apparent to those skilled in the art without departing from the scope of the present invention as defined by the attached claims.

As an example, the computer may be connected with several external network rings interconnected one to each other.

What is claimed is:

1. An event simulator for testing at least one physical network element of an MS-SPRING optical fiber telecommunication network comprising network elements and fiber optic spans interposed between the network elements to form a ring, the simulator comprising:

an electronic processor executing an event driven network simulation software program to simulate a network portion comprising network elements other than the at least one physical network element and to generate simulation signals, and an interface connecting said at least one physical network element and said processor for transmitting and receiving said simulation signals.

2. A simulator according to claim 1, wherein said interface comprises devices for generating and analyzing signal frames.

3. A simulator according to claim 2, wherein said interface comprises an electrical command connection between said electronic processor and said at least one physical network element.

4. A simulator according to claim 2, wherein said devices for generating and analyzing signal frames are connected with said electronic processor through serial electric command connections and connected with the at least one physical network element by optical fiber spans.

5. A method for simulating and testing the operation of an MS-SPRING optical fiber telecommunication network comprising network elements and fiber optic spans interposed between the network elements to form a ring, the method comprising the steps of providing at least one physical network element, the at least one physical network element being part of the telecommunication network to be simulated and tested;

providing an event simulator for virtually reproducing operating situations, said event simulator generating situation simulation signals; and providing an interface connecting said at least one physical network element and said event simulator;

wherein the step of providing said event simulator comprises the step of providing an electronic processor executing an event driven network simulation software program to simulate a network portion comprising network elements, other than the at least one physical network element and to generate signals that are indicative of said operating situations, and wherein said transmits said signals that are indicative of operating situations to said at least one physical network element.

6. A method according to claim 5, wherein said signals that are indicative of said operating situations comprises traffic rerouting signals, in particular pairs of bytes K1–K2.

7. A method according to claim 5, wherein said signals that are indicative of said operating situations comprise failure signaling signals.

8. A method according to claim 5, wherein said signals that are indicative of said operating situations comprise command signals.

9. A method according to claim 5, wherein said signals that are indicative of said operating situations comprise configuration signals.

* * * * *